United States Patent
Mueller et al.

[15] 3,692,848
[45] *Sept. 19, 1972

[54] PRODUCTION OF ALKENEDIOLS
[72] Inventors: Herbert Mueller, Frankenthal; Hermann Overwien; Horst Pommer, both of Ludwigshafen, all of Germany
[73] Assignee: Badische Anilin- & Soda-Fabrik Atiengesellschaft, Ludwigshafen/Rhein, Germany
[ * ] Notice: The portion of the term of this patent subsequent to April 13, 1988, has been disclaimed.
[22] Filed: June 6, 1969
[21] Appl. No.: 831,218

[52] U.S. Cl..........260/635 R, 260/617 R, 260/618 R, 260/635 M, 260/642
[51] Int. Cl..........................C07c 33/02, C07c 31/20
[58] Field of Search........................260/635 R, 638 R

[56] References Cited
UNITED STATES PATENTS

| | | |
|---|---|---|
| 3,574,773 | 4/1971 | Mueller et al..........260/638 R |
| 2,335,027 | 11/1943 | Ritter..................260/638 R |
| 2,624,766 | 1/1953 | Butler..................260/638 R |
| 3,414,588 | 12/1968 | Jones...................260/638 R |

OTHER PUBLICATIONS

Brsa, " J. Am. Chem. Soc." , Vol. 77, (1955), pages 4666 to 4668, Q01A5.

*Primary Examiner*—Leon Zitver
*Assistant Examiner*—Joseph E. Evans
*Attorney*—Johnston, Root, O'Keeffe, Keil, Thompson & Shurtleff

[57] ABSTRACT

Production of alkenediols from alkenols in which the hydroxyl group is in the $\beta$-position to, or is farther removed from, the double bond and which bear at least one hydrogen atom on at least one carbon atom adjacent to the carbon atoms of the double bond, by reaction with an aldehyde at from 235° to 400°C.

6 Claims, No Drawings

PRODUCTION OF ALKENEDIOLS

The invention relates to a new process for the production of alkenediols, particularly those having at least five carbon atoms.

Alkenediols belong to a group of substances of which only a few members are known which moreover could hitherto only be prepared by troublesome and protracted methods.

Since alkenediols can easily be converted into alkanediols which can be used in very many ways in organic synthesis, particularly for the production of high molecular weight substances, there has been a need for a simple synthesis of the alkenediols.

We have now found that alkenediols are obtained in a very simple manner when alkenols in which the hydroxyl group is in the β-position to, or is farther removed from, the double bond and which bear at least one hydrogen atom on at least one carbon atom adjacent to the carbon atoms of the double bond are reacted with an aldehyde at from 235° to 400°C. The reaction according to the invention may be represented by the following equation:

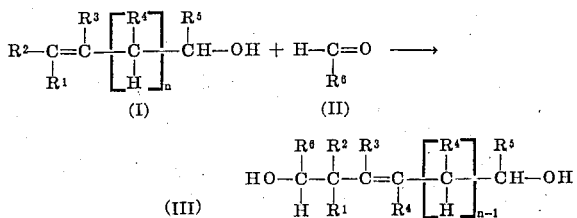

where $R^1$, $R^2$, $R^3$, $R^4$, $R^5$ and $R^6$ denote hydrogen atoms or hydrocarbon radicals having from one to eight carbon atoms and $n$ denotes one of the integers from 1 to 12.

Preferred radicals $R^1$ to $R^6$, apart from hydrogen atoms, are alkyl groups having from one to eight carbon atoms. Cycloalkyl groups having from five to eight ring members, aralkyl groups such as the benzyl group and aryl groups such as the phenyl or tolyl group are also included.

Radicals $R^1$ to $R^5$ may also be joined together to form rings having from five to 12 members. In industrially important compounds having the formula (III) the radicals $R^1$ and $R^6$ particularly denote hydrogen atoms, methyl groups or ethyl groups.

Preferred compounds to be used as alkenols having the formula (I) contain from four to 12 carbon atoms, particularly buten-1-ol-(4) and 2-methylbuten-1-ol-(4). Alkenols to be used as starting materials may be prepared in various ways. They are most simply obtained by reacting an olefin with an aldehyde according to the method which is described in U.S. patent application Ser. No. 705,628, filed Feb. 15, 1968, by Herbert Mueller et al and now U.S. Pat. No. 3,574,773.

Formaldehyde is especially suitable as the aldehyde having the Formula (II); others are alkylaldehydes having from two to twelve carbon atoms such as acetaldehyde, propionaldehyde, isobutyraldehyde and n-butyraldehyde. The following examples are also given: cyclohexylaldehyde as a cycloaliphatic aldehyde, phenylacetaldehyde as an araliphatic aldehyde and benzaldehyde as an aromatic aldehyde.

It is not necessary to start from the free aldehyde, but compounds of aldehydes may be used which are converted under the reaction conditions into the free aldehydes, such as hydrates or acetals, particularly dimethylacetal and diethylacetal, and also oligomers and polymers of aldehydes having the general formula: $(R-CHO)_3$ to $(R-CHO)_{100}$.

Examples of oligomers and polymers of aldehydes are: trioxane, paraformaldehyde, paraldehyde and their hydrates. The polymers may contain ester or ether groups as terminal groups. In the case of formaldehyde, it is particularly advantageous and economical to use aqueous formaldehyde solutions. It has been found that surprisingly the presence of water does not impair the reaction according to the invention.

The components having the Formulas (I and II) react with each other in stoichiometric amounts but it is often advantageous to use one of the components in an excess of up to 50 molar proportions, preferably a 5-molar excess.

Although it is not necessary to use a catalyst, it is advantageous to carry out the reaction in the presence of a base, particularly because acid may form by disproportionation of the aldehyde.

Examples of suitable bases are hydroxides, carbonates and bicarbonates of alkali metals and alkaline earth metals, and also salts of acids which are weaker than formic acid. Particularly suitable bases are also ammonia and organic amines and furthermore substances which have a buffering effect such as hexamethylenetetramine.

The bases are used only in small amounts, generally of from 0.001 to 10 percent, particularly from 0.01 to 1 percent, by weight with reference to the reaction mixture.

The optimum amount is dependent on reaction conditions and may easily be determined by experiment. The amount should preferably be such that acid formed during the reaction by disproportionation of the aldehyde is collected.

The reaction is carried out at temperatures of from 235° to 400°C, particularly from 240° to 350°C. Superatmospheric pressure may be used, preferably the vapor pressure of the reactants at the reaction temperature, for example at a pressure of up to 1,000 atmospheres gauge, in particular at pressures of from 50 to 500 atmospheres gauge.

It has proved to be advantageous to carry out the reaction at a pressure which is equal to the vapor pressure of the reactants at the reaction temperature of is greater than this vapor pressure and moreover the avoid the formation of a gas phase. This may be achieved for example by continuous supply of the starting materials and continuous withdrawal of the reaction products.

The residence time of the reactants in the reactor may vary within wide limits and is markedly dependent on the reaction temperature, the pressure and the molar ratios used. Residence times of from 5 to 1,000 minutes, particularly from 15 to 120 minutes, are preferred.

The reaction in accordance with this invention may be carried out without solvent; it may however be carried out in the presence of solvents and diluents which are inert under the reaction conditions such as saturated aliphatic or aromatic hydrocarbons, alcohols, ethers or water. Examples of suitable solvents are accordingly: hexane, octane, benzene, diethyl ether, dioxane, methanol, propanol or an excess of the reactants themselves. Mixtures of these solvents may also be used.

The solvents or diluents are generally used in from 0.1 to 10 times the weight of the reactants.

Sometimes it is advantageous to carry out the reaction in the presence of a substance having a large surface. Examples of suitable substances are: aluminum oxide, silica gel, molecular sieves, or activated carbon.

The reaction may be carried out in batches or continuously. For the preferred continuous performance of the reaction according to the invention use may be made for example of tubular high pressure reactors in which the reaction components are supplied at the bottom and the reaction mixture is withdrawn at the top.

Physical or chemical separation methods may be used in the conventional manner for working up the reaction mixture. The reaction mixture is generally distilled and unreacted starting components are recovered and may be returned to the reactor. In some cases it is advantageous to neutralize the reaction mixture prior to working it up in order to prevent elimination of water from the alkenediol formed.

Alkenediols obtainable according to the invention are valuable intermediates for organic synthesis. They may be converted for example into dienols by elimination of water or hydrogenated into valuable alkanediols.

The invention is illustrated by the following examples.

EXAMPLE 1

A mixture of 200 parts of 2-methylbuten-1-ol-(4), 150 parts of aqueous formaldehyde solution (37 percent by weight) and 0.15 part of hexamethylenetetramine is heated in an autoclave for 1 hour at 270°C while avoiding the formation of a gas phase. The reaction product is purified by distillation. 105 parts of 3-methylpenten-3-diol-1,5 is obtained having a boiling point of from 95° to 98°C at 0.2 mm, i.e., 49 percent of the theoretical conversion with reference to formaldehyde.

EXAMPLE 2

A mixture of 200 parts of buten-1-ol-(4) and 150 parts of aqueous formaldehyde solution is heated for 2 hours in an autoclave at 250°C. The reaction product obtained is purified by distillation. 90 parts of pentene-3-diol-1,5 is obtained.

What we claim is:

1. A process for the production of an alkenediol which comprises reacting an alkenol of the formula

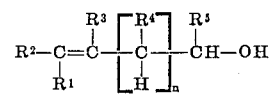

wherein $R^1$, $R^2$, $R^3$, $R^4$, and $R^5$ each denotes a member selected from the group consisting of hydrogen and alkyl of one to eight carbon atoms and n is an integer of from one to 12 with an aldehyde having the formula

wherein $R^6$ denotes a member selected from the group consisting of hydrogen and alkyl of one to eight carbon atoms at from 235° to 400°C, in the presence of 0.001 to 10 percent by weight with reference to the total amount of reaction mixture of a base selected from the group consisting of alkaline hydroxides, carbonates and bicarbonates, ammonia and hexamethylenetetramine at a pressure of 50 to 500 atmospheres gauge.

2. A process as claimed in claim 1 wherein the alkenol used as starting material has from four to 12 carbon atoms in the molecule.

3. A process as claimed in claim 1 carried out at a temperature of from 240° to 350°C.

4. A process as claimed in claim 1 wherein the aldehyde used is formaldehyde.

5. A process as claimed in claim 1 wherein the alkenol used as starting material is buten-1-ol-(4).

6. A process as claimed in claim 1 wherein the alkenol used as starting material is 2-methylbuten-1-ol-(4).

* * * * *

PO-1050
(5/69)

UNITED STATES PATENT OFFICE
CERTIFICATE OF CORRECTION

Patent No. 3,692,848          Dated September 19, 1972

Inventor(s) Mueller et al

It is certified that error appears in the above-identified patent and that said Letters Patent are hereby corrected as shown below:

On the Cover Sheet, insert the following:
-- [30] Foreign Application Priority Data
    June 14, 1968    Germany ------------P1768666.7 --

Column 2, lines 49 and 50 respectively
      " of is " should read -- or is --
      " the " should read -- to --

Signed and sealed this 10th day of April 1973.

(SEAL)
Attest:

EDWARD M. FLETCHER, JR.            ROBERT GOTTSCHALK
Attesting Officer                  Commissioner of Patents